A. J. L. ECKERSLEY.
APPARATUS FOR DELIVERING AND MIXING DRINKS OR OTHER LIQUIDS.
APPLICATION FILED JUNE 13, 1913.
1,140,888.
Patented May 25, 1915.
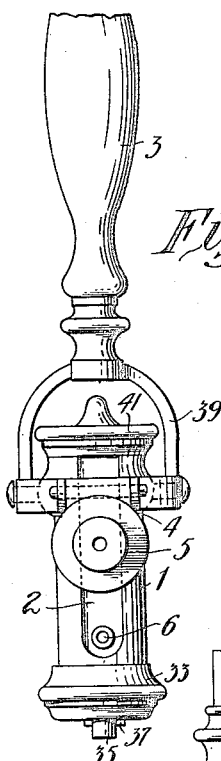
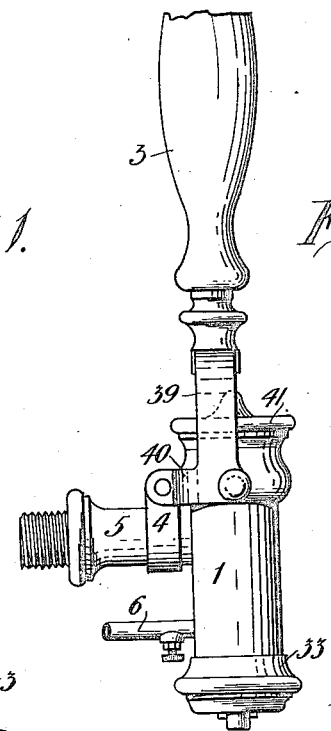
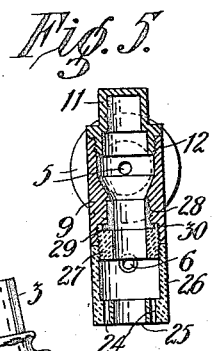
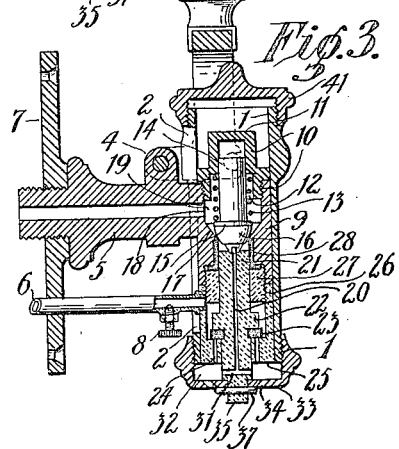
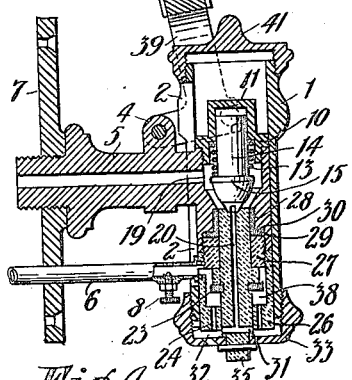
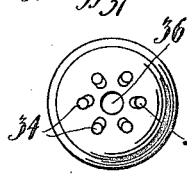
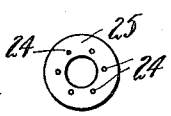
Witnesses:
Inventor:
A. J. L. Eckersley
per
H. W. Waghorn
Attorney.

UNITED STATES PATENT OFFICE.

ARTHUR JOHN LEWIS ECKERSLEY, OF SOUTH MELBOURNE, VICTORIA, AUSTRALIA.

APPARATUS FOR DELIVERING AND MIXING DRINKS OR OTHER LIQUIDS.

1,140,888.

Specification of Letters Patent.   Patented May 25, 1915.

Application filed June 13, 1913. Serial No. 773,451.

*To all whom it may concern:*

Be it known that I, ARTHUR JOHN LEWIS ECKERSLEY, a citizen of the Commonwealth of Australia, residing at the corner of Clarendon and Haig streets, South Melbourne, in the State of Victoria and said Commonwealth, have invented a new and useful Apparatus for Delivering and Mixing Drinks or other Liquids, of which the following is a specification.

Hitherto there has not been any effective means for automatically delivering and mixing liquids, such as lemon syrup and soda water, or the like, the methods at present employed being crude, the operation being performed by hand and the drinks are not thoroughly mixed.

This invention has been devised in order to provide a cheap, simple and efficient appliance adapted to be connected to the sources of liquid supply and on the operation of the controlling handle, the required proportionate quantities of the liquids are delivered to the glass or other receptacle placed ready to receive it below the delivery orifice or nozzle of the appliance, the liquids being automatically supplied thereto.

In order that the invention may be more readily understood, it will now be described with reference to the accompanying drawings, in which—

Figure 1 is a rear elevation of the appliance constructed according to this invention. Fig. 2 is a side elevation thereof, and Fig. 3 is a vertical central section of the appliance illustrating the valve mechanism in its lowered or normal position, while Fig. 4 is a similar view to Fig. 3, illustrating the valve mechanism in its raised position. Fig. 5 is a vertical central section illustrating the valve seats and casings therefor. Fig. 6 is a view in plan of the delivery nozzle, and Fig. 7 is a view illustrating an essential detail embodied in this invention.

Like reference numerals indicate the same or corresponding parts in all the figures.

The invention consists of a cylindrical casing 1 having a vertical opening 2 along one side thereof and containing a valve appliance controlled by a hand lever 3 which is pivotally connected to a lug or ring 4 fitted to the upper supply pipe 5 positioned at right angle to the said casing 1 and projecting through the opening 2 thereof.

Suitably distanced below this upper supply pipe 5 is another supply pipe 6 also extending at right angles to the casing through the opening 2 thereof. These pipes 5, 6 are connected to the source of supply and to a suitable stand, or, preferably, a sole plate or the like 7, adapted to be fitted to the inside of the counter where the drinks are to be retailed or delivered in the proportionate quantities required.

The upper supply pipe 5 delivers, under sufficient pressure, the soda water or other suitable drink, and the lower smaller pipe 6 delivers the lemon syrup or other liquid which is to be mixed with that passing through the upper pipe.

The lower pipe 6 is preferably provided with a set screw or valve 8 passing through one side of the pipe 6 and provided with a milled head and adapted to be adjusted to close or open said pipe 6 and adjust the flow of liquid therethrough, and so determine the proportion of liquid to be supplied.

The upper supply pipe 5 is arranged at right angles to the casing 1, and has a sleeve 9 projecting downwardly within the said casing to a suitable distance.

The sleeve 9 is provided with a detachable cap 10 having an upwardly projecting tubular and hollow crown 11, and this cap, below the crown, has an enlarged portion at 12 to receive a helical spring 13 passing around the stem 14 of a conical valve 15. The valve 15 is preferably leather faced at 16 and is adapted to rest upon a tapering or other suitable seat 17 formed in the sleeve 9 immediately below the inlet orifice 18 thereof.

The valve 15 is therefore adapted to slide vertically within a compartment 19 formed in the sleeve 9 and is adapted to normally close a vertical delivery passage 20 formed in a tube or valve stem 21 which is constructed of suitable non-corrosive material and formed with a shoulder or flange 22, being grooved immediately below the same. This groove carries a rubber disk valve 23 adapted to normally close the orifices 24 formed around the base 25 of a casing or sleeve 26 which is adapted to project upwardly along the inside of the casing 1 against the lower end of the sleeve 9 and this lower casing or sleeve 26 receives the end of the lower supply pipe 6.

The sleeve 9 and the lower sleeve or casing 26 are held together by means of a screw threaded nipple 27 constructed of non-corrosive material and carrying a flanged leather washer 28, the flange 29 thereof being adapted to rest between the upper end of the nipple 27 and a shoulder 30 in the lower end of the sleeve 9.

The supply passage 20 controlled by the upper valve 15 projects centrally down the tube or stem 21 to a point below the orifices 24 which are adapted to deliver the liquid from the lower supply pipe. The passage 20 delivers the liquid from the upper supply pipe through a horizontal passage 31 extending to either side of the stem 21 into a small chamber 32 formed by a detachable nozzle 33 having suitable perforations 34 around the face thereof, through which the mixed liquid is ejected from the appliance. The lower end of the lower valve stem or tube 21 is formed with an extension 35 passing through aperture 36 formed in the center of the nozzle and this extension is provided with a retaining pin, nut or washer 37 in order to insure the lower rubber valve 23 being returned to its normal position covering the lower orifices 24 of the lower valve chamber 38 on the return of the handle 3 to its normal position.

The handle 3 is provided with a U piece or bifurcated end 39 connected to the sides of the outer casing 1 and provided with rearwardly extending lugs or arms 40 pivoted to the lug or ring 4 above described.

In operation, sufficient head or pressure is given to the liquids which are delivered through the delivery pipes 5 and 6, the proportionate quantity of liquids being controlled by a suitable valve or valves. On the handle being operated as illustrated in Fig. 4, the lower valve 23 and the upper valve 15 are raised simultaneously from their seats, the liquid from the upper pipe passing into the mixing chamber 32 of the nozzle simultaneously with the syrup or other liquid controlled by the lower valve, the liquids being thereby thoroughly mixed and delivered into the receptacle placed ready to receive the mixture below the nozzle. The raising of these valves is caused by the handle operating the outer casing 1 which carries the valves from their seats and leaves the passages clear for the liquids to flow therethrough and through the nozzle, the leather washer 28 preventing the soda water or other liquid from the upper pipe 5 passing back through the lower liquid pipe. The pin 37 insures the return of the lower disk valve, while the helical spring 13 returns the upper valve 15 to its normal position on its seat on the return of the lever 3 and the outer casing 1 to their normal positions.

It will be readily understood that the sleeves and pipes or other parts in contact with the liquids as they pass through the appliance, may be formed of or internally lined with suitable non-corrosive material. The outer casing is provided with a detachable cap 41, the delivery nozzle 33 on the bottom of the machine being also detachable as will be readily understood and as illustrated in the drawings.

What I claim as my invention and desire to secure by Letters Patent, is—

1. In apparatus for mixing and delivering drinks and other liquids, a movable casing formed with a vertical opening along its length, liquid supply pipes passing through said opening and connecting sleeves held by a nipple or the like connection, a leather washer arranged between the nipple and the sleeve of the upper supply pipe and around the stem of a vertically sliding valve controlling the delivery of liquid through the lower supply pipe, said valve being formed with a passage normally closed by an upper valve controlling the delivery of liquid from the upper supply pipe and adapted to be moved in a vertical direction simultaneously with the lower valve, means for returning said upper valve to its seat, and means for raising and lowering the outer casing controlling the movement of the valves.

2. In apparatus for mixing and delivering drinks and other liquids, a cylindrical casing having a vertical opening along its length and containing a double valve appliance controlling the delivery of liquids from supply pipes passing through said opening, a delivery nozzle at the lower end of said casing, and a handle for raising and lowering the casing a short distance in a vertical direction to open and close the valves controlling the supply of liquids.

3. In apparatus for automatically delivering and mixing drinks and other liquids, fixed supply pipes passing through a vertical opening in a movable outer casing, a sleeve formed on the end of the upper supply pipe flush around the inside of said casing and at right angles to the pipe, a detachable cap fitted to the sleeve, said sleeve forming a valve compartment provided with a tapering valve seat, a valve slidably arranged in said compartment and adapted to normally close the outlet passage of said compartment, the passage being formed centrally in a tube or valve stem carrying a disk valve adapted to normally close the orifices of a cap or sleeve connected to the upper sleeve by a nipple, a leather washer around the upper end of said lower valve stem and the inside of the upper sleeve, a detachable cap fitted to the upper end and a delivery nozzle at the lower end of said casing, substantially as described.

4. In apparatus for delivering and mixing drinks, an outer casing carrying a delivery nozzle and slidably arranged around fixed valve casings connecting liquid supply pipes, a valve controlling the liquid supply arranged in each valve casing and adapted to be opened on the raising of the outer casing and closed on the lowering thereof, the mixed liquids being allowed to flow through the nozzle on the rasing or opening of the said valves.

5. In apparatus for mixing and delivering drinks and other liquids, sleeves 9, 26 arranged within a casing 1 forming valve compartments connecting supply pipes 5, 6, a supply controlling valve 8, a cap 10 fitted to said sleeve 9, a valve 15 fitted with a return spring 13 arranged in the sleeve 9 adapted to normally close the passage 20 in the valve stem or tube 21, a valve 23 carried by said stem 21 and arranged in the sleeve or cap 26, being adapted to normally close the orifices 24 in the base of said sleeve or cap, a passage 31 delivering into the nozzle 33, detachably mounted to the casing and having delivery holes 34, a detachable cap fitted to the casing, the lower end of the valve stem 21 seating on and passing through the nozzle and a handle 3 for raising and lowering the outer casing and operating the valves in a vertical direction substantially as and for the purposes specified.

6. In apparatus for mixing and delivering drinks and other liquids, a vertically sliding outer casing controlling the opening and closing of valves arranged in fixed sleeves within said casing connected to liquid supply pipes, a delivery nozzle fitted to the lower end of said casing adapted to receive the liquids from the passages controlled by the valves, and holes formed in said nozzle adapted to deliver the mixed liquids in proportionate quantities from the appliances.

In witness whereof I affix my signature in the presence of two witnesses.

ARTHUR JOHN LEWIS ECKERSLEY.

Witnesses:
   A. EDWARDS,
   SIDNEY HENDLEY.